UNITED STATES PATENT OFFICE.

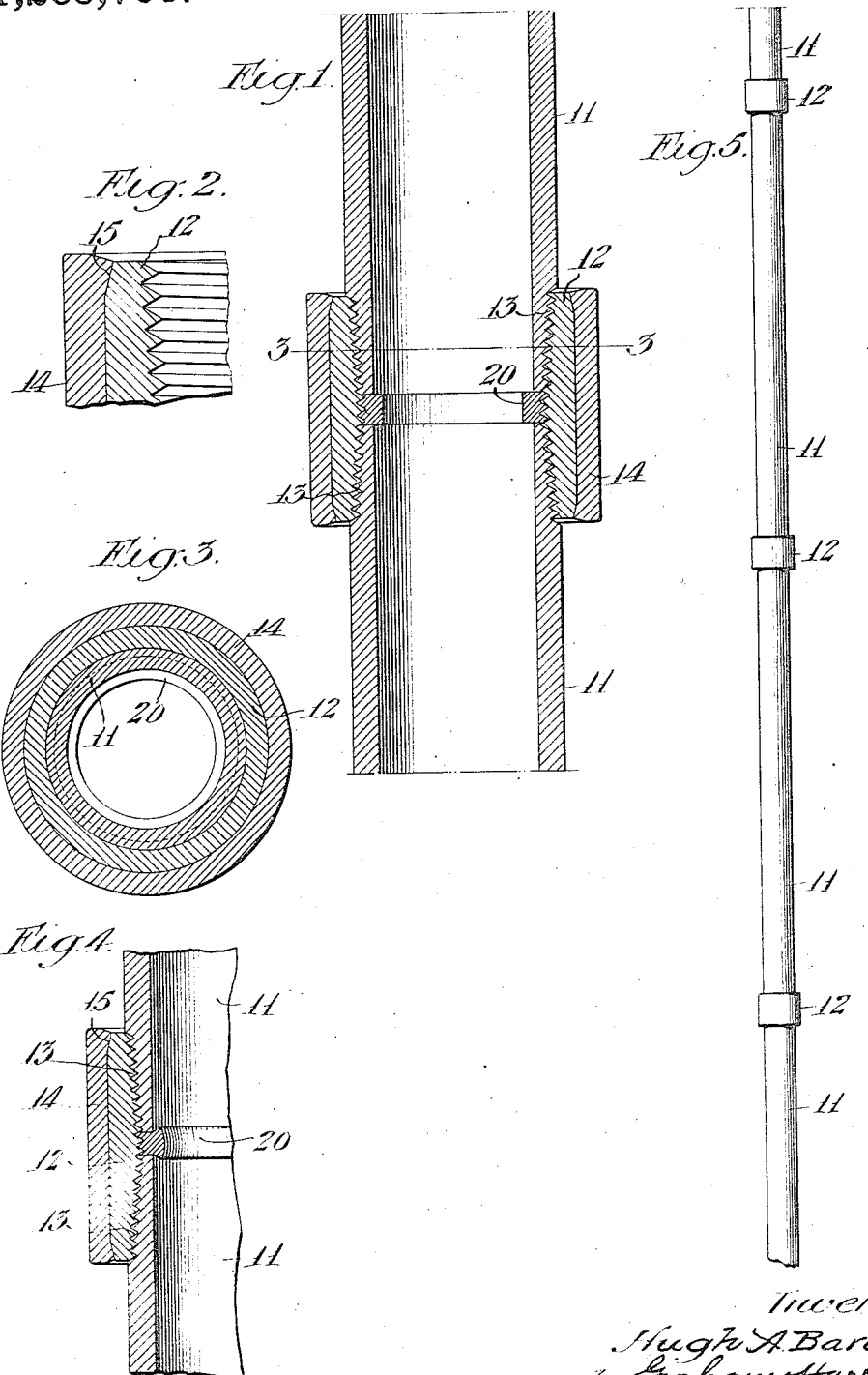

HUGH A. BARDEEN, OF LOS ANGELES, CALIFORNIA.

COLLAR AND LEAD RING AND PROCESS OF COUPLING DRILL-PIPES.

1,265,706.   Specification of Letters Patent.   Patented May 7, 1918.

Application filed April 28, 1917.   Serial No. 165,290.

*To all whom it may concern:*

Be it known that I, HUGH A. BARDEEN, a citizen of the United States, residing at Los Angeles, in the county of Los Angeles and State of California, have invented a new and useful Collar and Lead Ring and Process of Coupling Drill-Pipes, of which the following is a specification.

My invention relates to pipes, and is particularly applicable to drill pipe such as is used in the rotary system of drilling oil wells in common use in the California and mid-continental oil fields of the United States. In drilling such oil wells by the rotary system, a string of drill pipe is rotated, this string carrying a bit at its lower end. The various joints of pipe are connected at regular intervals by collars, in either end of which the pipe is threaded. Due to the fact that the pipe is sometimes a little crooked, it is quite common for these collars to wear eccentrically, and even where no eccentric wear takes place, the wear and destruction of collars is very rapid.

The principal object of my invention is to provide means whereby worn collars may be reconstructed at a nominal cost.

In coupling together the various joints of pipe of a drilling string, power driven pipe tongs are commonly used. As the pipe is subjected to excessive driving strains there is a constant tendency for the pipes to turn deeper into the collars and eventually the ends of the two pipes come together. No further approach between them being possible, when this occurs the excessive driving strains tend to burst the collars. A further object of my invention is to provide yielding means between the ends of the pipe inside the collars, so that bursting of the collars is largely prevented.

Further objects and advantages will be set forth hereinafter.

In the drawings, which are for illustrative purposes only:

Figure 1 is a sectional view of a reconstructed collar and lead ring in place in a pipe joint.

Fig. 2 is a sectional elevation on a larger scale showing the edge of a collar with its reinforcing jacket.

Fig. 3 is a section on a plane represented by the line 3—3 in Fig. 1.

Fig. 4 is a section on an enlarged scale showing the lead ring after it has been slightly compressed, and Fig. 5 is an elevation partly in section of a string of pipe equipped with the invention.

In these drawings, a string of pipe consisting of joints of pipe 11, secured together by collars 12, is shown. The pipes 11 are provided with threads 13 on either end, these threads engaging the collars 12 as best shown in Fig. 1. The collars 12 tend to wear rapidly, due to their being turned in the ground and bearing on the rock, sand, or other natural formations, through which the well passes. When these collars become worn they are removed from the pipe 11 and are turned down so that the outside is concentric with the bore. A jacket 14 is then bored out somewhat smaller than the exterior of the collar 12. The jacket 14 is then heated so that it can be placed over the collar 12, shrinking thereon as it cools. The collar 12 has its end slightly chamfered, and the jacket 14 is peened down as shown in Fig. 2 over the bevel 15, so that the jacket 14 cannot come off the collar 12.

For the purpose of preventing the collar from bursting, a lead ring 20 is placed inside the collar 12 between the ends of pipe 11. Whenever an excessive strain comes on the pipe the lead in the ring 20 flows slightly, thereby allowing the pipes 11 to turn with relation to each other and relieving the strain.

The method of operation has been explained in the above description.

I claim as my invention:—

1. The method of reconstructing worn pipe collars which comprises turning down the collar to an even thickness and shrinking a jacket thereon.

2. The method of reconstructing worn pipe collars which comprises turning down the collar to an even thickness, shrinking a jacket thereon, and upsetting the end of the jacket to prevent axial movement of the jacket on the collar.

In testimony whereof, I have hereunto set my hand at Los Angeles, California, this 21st day of April, 1917.

HUGH A. BARDEEN.